United States Patent
Tinsley et al.

(10) Patent No.: US 6,358,449 B1
(45) Date of Patent: Mar. 19, 2002

(54) APPARATUS AND METHOD FOR REDUCING DIE ACCUMULATION

(75) Inventors: Jon Edward Tinsley, Milton, FL (US); Charles H. Ellison; Charles John Morell, both of Roswell, GA (US); Silverio D. de la Cruz, Jr., Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/444,879

(22) Filed: Nov. 22, 1999

(51) Int. Cl.[7] ................................. B29C 47/14
(52) U.S. Cl. ................. 264/169; 264/211.13; 425/72.1; 425/461
(58) Field of Search .................. 264/39, 169, 211.13; 425/72.1, 461

(56) References Cited

U.S. PATENT DOCUMENTS

| 3,377,655 A | 4/1968 | Kucharski et al. |
|---|---|---|
| 3,502,757 A | 3/1970 | Spencer |
| 3,647,346 A | 3/1972 | Minnie |
| 3,734,984 A | 5/1973 | Hoffman |
| 3,829,274 A | 8/1974 | Melead |
| 3,832,120 A | 8/1974 | Shaffer |
| 3,847,516 A | 11/1974 | Hoffman |
| 4,282,177 A | 8/1981 | Kurtz et al. |
| 5,008,056 A | 4/1991 | Kurtz et al. |
| 5,417,907 A | 5/1995 | Ohhata et al. |
| 5,458,836 A | 10/1995 | Rakestraw et al. |
| 5,505,609 A | 4/1996 | Cloeren et al. |
| 5,539,076 A | 7/1996 | Nowlin et al. |
| 5,655,948 A | 8/1997 | Yapel et al. |
| 5,851,137 A | 12/1998 | Bhave et al. |

*Primary Examiner*—Leo B. Tentoni
(74) *Attorney, Agent, or Firm*—Pauley Petersen Kinne & Fejer

(57) ABSTRACT

A polymeric film extrusion die having a die body with a molten polymer inlet, a molten polymer exit, and forming a molten polymer conduit providing a fluid communication between the molten polymer inlet and the molten polymer exit. The die body includes a peripheral edge at a periphery of the molten polymer exit, which peripheral edge has a thickness less than or equal to about 0.005 inches. The apparatus further includes a molten polymer exit heated gaseous fluid supply adapted to provide heated gaseous fluid proximate the molten polymer exit so as to maintain the die temperature at the molten polymer exit as low as possible without affecting the processability/integrity of the product film.

7 Claims, 1 Drawing Sheet

APPARATUS AND METHOD FOR REDUCING DIE ACCUMULATION

BACKGROUND OF THE INVENTION

1. Field of the Invention

This invention relates to a method and apparatus by which the rate of accumulation of polymeric or other material such as but not limited to diatemaceous earth, wax, and calcium carbonate on the lip of an extrusion die, in particular, a polymeric film extrusion die is reduced.

2. Description of the Prior Art

Extrusion of polymers through a die to form shaped extrudates is a well known process, and is extensively used commercially. Items that can be made by polymer extrusion include films, fibers, sheets, strands, and shaped profiles. The extrudates are usually essentially continuous and are often cut into usable lengths.

The extrusion process is one in which the molten polymer is forced through a shaped orifice, and the extrudate is then cooled, usually until solid. The cross section of the extrudate (perpendicular to the flow direction) usually has the same shape as the orifice. Due to the importance of extrusion commercially, improved dies are constantly being sought so that the process runs more cheaply and/or with less off-quality production. A particular problem in this process is the accumulation of small portions of molten polymer other material such as but not limited to diatemaceous earth, wax, and calcium carbonate around the die orifice which can cause problems of product defects and downtime. In the case of film and sheeting, the material collecting along the length, and adjacent to, the die orifice can cause a defect in the surface of the cast sheet or film known as a die line. Such a die line results from a sharply irregular wetting contact at the corner of the die orifice where the extruded sheet breaks contact with the metal of the die orifice. The build-up of foreign materials adjacent to the die orifice provides sites for such irregular wetting contact. This foreign material can take several forms and can be caused by many different phenomena. In the case of flat sheeting, such a build-up of foreign material at the two ends of the orifice can cause ragged and non-uniform edges on the extruded sheet.

While there are many recognized sources for the foreign materials that cause die lines, and/or ragged and unsharp edges and/or other defects in the extruded sheet, one of the most difficult to control is the slow accumulation of material build-up directly adjacent to the orifice.

One attempt at solving this problem is taught by U.S. Pat. No. 3,502,757 to Spencer. There, it is indicated that certain polymeric thermoplastics including polyamides, polycarbonates, and polyesters, and more particularly, polyethylene terephthalate, give up various vapors and low molecular constituents in a "flash" type of process at the instant that the material which is extruded under pressure is exposed or reduced to atmospheric pressure as it leaves the die orifice. The presence of high concentrations of these vaporous contaminants in the area directly adjacent to the extruding plastic is indicated to be the cause of the material build-up. To resolve this problem, the '757 patent teaches to replace the contaminated air in the immediate vicinity of the extrusion orifice with clean air by directing an air stream against one or both sides of the extruded sheet.

An alternate approach is taught by U.S. Pat. No. 5,458,836 wherein the focus of the invention disclosed therein is to modify the orifice shape. In particular, the '836 patent teaches a die having flared orifices for the extrusion of polymers having a plurality of zones of given lengths defined by corresponding surfaces and the relative dimensions of the zone lengths and surface configurations.

U.S. Pat. Nos. 3,734,984 and 3,847,516, both to Hoffman, teach extrusion of a molten polymeric plastic under pressure through an orifice while impinging a blast of clean hot air or other gas against the extruded product at the instant it leaves the orifice and introducing into the gas, as by steam injection or by water sprays, water vapor so as to maintain its humidity at a level corresponding to a dew point of at least 35 F., and preferably 50–80 F. U.S. Pat. No. 5,417,907 to Ohhata et al., teaches a die plate for use in the extrusion of plastics which is capable of preventing or substantially reducing the formation of resin masses at the die face of the die plate by providing an extrusion orifice having an increased diameter in the vicinity of the die face.

Yet other means for reducing the accumulation of material on the edge or lip of a film extrusion die include the addition of additives to the polymer.

In spite of the advances that have been made, the problem continues to exist.

SUMMARY OF THE INVENTION

Accordingly, it is one object of this invention to provide a method and apparatus for reducing the rate of accumulation of material on the edge or lip of a polymer extrusion die.

This and other objects of this invention are addressed by a method comprising the steps of machining the polymer exit edge of a polymer extrusion die to a thickness of less than about 0.005 inches, passing a molten polymer through the extrusion die, forming a polymeric extrudate, and blowing a heated gaseous fluid onto the polymer exit edge. The shape of the die lip is such that the 0.005 inch edge is adjacent to the polymer at the exit of the die. Due to the machined edge at the polymer exit, there is essentially no surface remaining on which material can accumulate.

The apparatus for reducing the rate accumulation of material on the lip of a polymer extrusion die in accordance with one embodiment of this invention comprises a polymer extrusion die comprising a die body having a molten polymer inlet and a molten polymer exit and forming a molten polymer conduit providing a polymer communication between the molten polymer inlet and the molten polymer exit. The die body further comprises a peripheral edge at a periphery of the molten polymer exit, which peripheral edge has a thickness of less than about 0.005 inches. Edge thicknesses above about 0.005 inches normally do not provide the desired result. A molten polymer exit heated air supply adapted to provide heated air to the polymeric extrudate is disposed proximate the molten polymer exit.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

Definitions

As used herein, the term "comprising" is inclusive or open-ended and does not exclude additional unrecited elements, compositional components, or method steps.

As used herein, the term "polymer" generally includes, but is not limited to, homopolymers, copolymers, such as for example, block, graft, random and alternating copolymers, terpolymers, etc., and blends and modifications thereof. In addition, unless otherwise specifically limited, the term "polymer" also includes all possible geometric configurations of the molecule. These configurations include, but are not limited to, isotactic, atactic, syndiotactic and random symmetries.

As used herein, the term "breathable" refers to a film or laminate having water vapor transmission rate (WVTR) of at least about 300 g/m$^2$/24 hours measured using ASTM Standard E96-80, upright cup method.

The term "die opening section" refers to that portion of an extrusion die through which polymer flows. In a film extrusion die, the die opening section is generally a single opening bounded on both sides by die lips. In a filament die used to make spunbond or meltblown filaments, the die opening section is the entire portion of the die which contains small filament openings in rows or another pattern, and is bounded on both sides by the outermost rows of filament openings.

Figure 1:
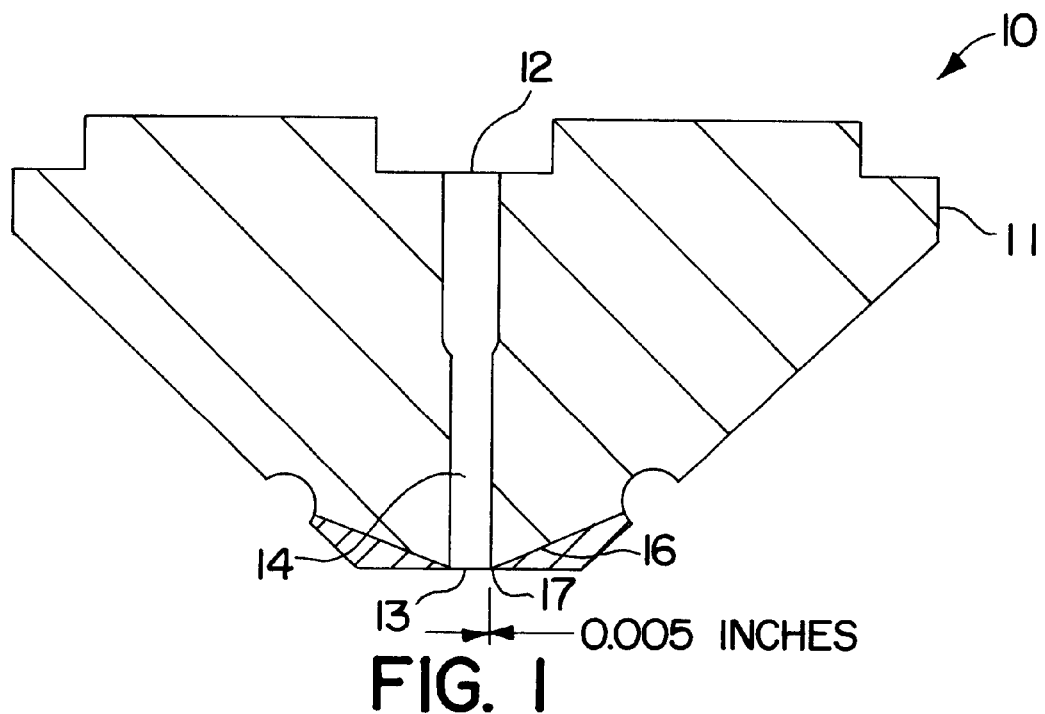
FIG. 1 is a cross-sectional view of a portion of a polymeric film extrusion die in accordance with one embodiment of this invention.

Although discussed herein in terms of a polymer film extrusion die, this invention may be applied to any type of polymer extrusion die including, without limitation, film extrusion dies, strand extrusion dies, melt spinning and melt blowing dies used to make nonwoven webs. FIG. 1 shows a cross-sectional view of an extrusion die 10 for extrusion of a polymeric film. Extrusion die 10 comprises an extrusion die body 11, a molten polymer inlet 12 disposed on one side of extrusion die body 11 and a molten polymer exit 13, or die opening section, disposed on the opposite side of extrusion die body 11, which molten polymer inlet 12 and molten polymer exit 13 are joined by extrusion orifice 14 formed by extrusion die body 11, which extrusion orifice 14 provides fluid communication between molten polymer inlet 12 and molten polymer exit 13. Extrusion die body 11 comprises die lip 16 disposed at molten polymer exit 13. In accordance with a particularly preferred embodiment of this invention, die lip 16 is machined to an edge 17 having a thickness of 0.005 inches or less at molten polymer exit 13, leaving essentially no flat surface on which polymeric material can accumulate.

In order to reduce the rate of polymer accumulation at die lip 16, maintaining the temperature of die lip 16 below a certain value appears to be a critical factor.

Figure 2:
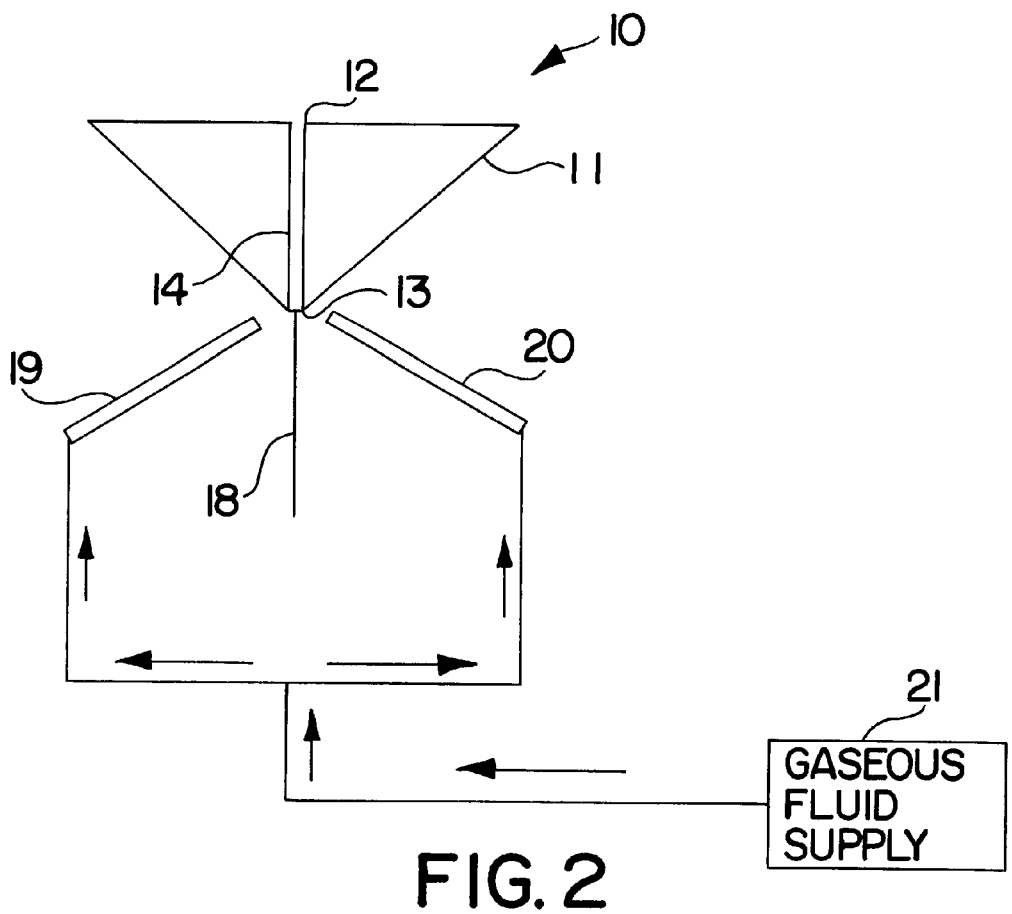
FIG. 2 is a schematic diagram of a polymeric film extrusion die including means for providing heated air to the molten polymer exit of the extrusion die.

FIG. 2 is a schematic diagram showing a portion of a polymeric film extrusion apparatus in accordance with one embodiment of this invention. The apparatus comprises a polymeric film extrusion die 10 comprising an extrusion die body 11 having a molten polymer inlet 12, a molten polymer exit 13 and an extrusion orifice 14 providing fluid communication between molten polymer inlet 12 and molten polymer exit 13. Extending from molten polymer exit 13 is film 18 on each side of which is disposed a gaseous fluid conduit 19, 20 connected to a heated gaseous fluid supply 21 and configured so as to blow a heated gaseous fluid directly onto die lip 16 of extrusion die body 11.

The method for reducing the rate of material accumulation on a film extrusion die lip in accordance with one embodiment of this invention comprises the steps of producing a film extrusion die having a polymer exit edge having a thickness less than or equal to about 0.005 inches, passing a molten polymer through the film extrusion die, forming a film, and cooling the polymer exit edge to a temperature less than a softening temperature of the polymer. In accordance with one preferred embodiment of this invention, the polymer exit edge is cooled by blowing a heated gaseous fuel, preferably heated air, onto the polymer exit edge from at least one side of the film.

The basic tenet of the method of this invention is to maintain as low a die temperature as possible at the molten polymer exit, that is the lowest possible temperature at which the processability/integrity of the product film is not affected. In accordance with one preferred embodiment of this invention, the gaseous fluid is supplied at a temperature range between 75° F. and 100° F.

EXAMPLE

The die lip closest to the extruder was machined to a 0.005 inch edge at the edge where the polymer exits the extruder. An air supply source was fixed with a 2 inch outside diameter flexible tubing shaped into a rectangle at the exit such that 100° F. air was blown onto the die lip on both sides of the polymer stream exiting the extruder. No discernable material accumulation was observed to occur on the die lip.

The method of this invention was also tested on a pilot extrusion line. Air flow during the pilot trials was provided at the rate of about 1100 feet per minute onto the die lip/polymer exit edge on both sides of the product film at a temperature of about 75° F. As in the case of the air supply source trial, no discernable accumulation of polymeric material on the die lip was observed.

In both the hair dryer trials and the pilot trials, the extruded film was a breathable film. However, the method of this invention may be applied to the extrusion of most types of polymeric films.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus comprising:

a polymeric film extrusion die comprising a die body having a molten polymer inlet, a molten polymer exit, and forming a molten polymer conduit providing a fluid communication between said molten polymer inlet and said molten polymer exit;

said die body further comprising a peripheral edge at a periphery of said molten polymer exit, said peripheral edge having a thickness one of less than or equal to about 0.005 inches; and a molten polymer exit heated air supply adapted to provide heated air proximate said molten polymer exit.

2. A method for reducing the rate of material accumulation on a film extrusion die lip comprising the steps of:

producing a film extrusion die having a polymer exit edge having a thickness one of less than or equal to about 0.005 inches;

passing a molten polymer through said film extrusion die, forming a film; and cooling said polymer exit edge to a temperature less than a softening temperature of said polymer.

3. A method in accordance with claim 2, wherein said polymer exit edge is cooled by blowing a heated gaseous fluid onto said polymer exit edge from at least one side of said film.

4. A method in accordance with claim 3, wherein said heated gaseous fluid is air.

5. A method in accordance with claim 2, wherein said gaseous fluid is supplied to a temperature of less than about 100° F.

6. A method in accordance with claim 5, wherein said temperature of said gaseous fluid is in the range of about 75° F. to about 100° F.

7. A method in accordance with claim 2, wherein said film is breathable.

* * * * *